(12) United States Patent
Soltner

(10) Patent No.: US 11,433,794 B2
(45) Date of Patent: Sep. 6, 2022

(54) VEHICLE SEAT HEADREST EQUIPPED WITH AUDIO SPEAKER UNITS

(71) Applicant: FAURECIA Sièges d'Automobile, Nanterre (FR)

(72) Inventor: Stéphane Soltner, Mailleroncourt Charrette (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 181 days.

(21) Appl. No.: 16/715,254

(22) Filed: Dec. 16, 2019

(65) Prior Publication Data
US 2020/0189436 A1  Jun. 18, 2020

(30) Foreign Application Priority Data

Dec. 17, 2018 (FR) ..................................... 18 73110

(51) Int. Cl.
| | |
|---|---|
| *B60N 2/879* | (2018.01) |
| *B60N 2/803* | (2018.01) |
| *H04R 1/02* | (2006.01) |
| *H04R 1/32* | (2006.01) |
| *B60N 2/885* | (2018.01) |

(52) U.S. Cl.
CPC ............. *B60N 2/879* (2018.02); *B60N 2/885* (2018.02); *H04R 1/025* (2013.01); *H04R 2499/13* (2013.01)

(58) Field of Classification Search
CPC ........ B60N 2/879; B60N 2/865; B60N 2/868; B60N 2/874; B60N 2/838
See application file for complete search history.

(56) References Cited

U.S. PATENT DOCUMENTS 4,440,443 A * 4/1984 Nordskog .......... B64D 11/0606
                                                                297/397
5,687,230 A    11/1997 Olausson
(Continued)

FOREIGN PATENT DOCUMENTS

| CN | 2695284 | 4/2005 |
|---|---|---|
| CN | 107000620 A | 8/2017 |

(Continued)

OTHER PUBLICATIONS

French Preliminary Search Report for French App. No. FR1873110 dated Oct. 24, 2019, BET190415 FR, 8 pages.

(Continued)

*Primary Examiner* — Shin H Kim
(74) *Attorney, Agent, or Firm* — Barnes & Thornburg LLP

(57) ABSTRACT

A headrest for a vehicle seat, comprising a support configured to receive and support the head of a seat occupant, and, connected to said support, at least one speaker system comprising: a speaker unit comprising a loudspeaker received in an airtight housing, a guide system for guiding the speaker unit relative to the support of the headrest, said guide system being configured so that the speaker unit can transition from a first usage position to a second usage position, and vice versa, the transition from the first usage position to the second usage position, and vice versa, corresponding to a movement combining a translation of the speaker unit and a rotation of the speaker unit.

14 Claims, 6 Drawing Sheets

(56) References Cited

U.S. PATENT DOCUMENTS

| | | | |
|---|---|---|---|
| 5,997,091 A * | 12/1999 | Rech | B60N 2/868 |
| | | | 297/391 |
| 6,203,657 B1 | 3/2001 | Collison | |
| 6,424,055 B1 | 7/2002 | Hambsch | |
| 6,654,474 B2 * | 11/2003 | Bito | H04M 1/05 |
| | | | 381/364 |
| 6,744,898 B1 | 6/2004 | Hirano | |
| 6,975,737 B2 | 12/2005 | Hirao | |
| 7,609,946 B2 | 10/2009 | Schedivy | |
| 8,109,569 B2 | 2/2012 | Mitchell | |
| 8,109,570 B2 | 2/2012 | Nishiura | |
| 8,130,987 B2 * | 3/2012 | Kaneda | H04R 1/26 |
| | | | 381/302 |
| 8,220,869 B2 | 7/2012 | Kolich | |
| 8,240,756 B2 | 8/2012 | Hartlaub | |
| 8,295,535 B2 | 10/2012 | Tracy | |
| 8,348,338 B2 | 1/2013 | Galecka | |
| 8,598,850 B2 | 12/2013 | Pisharodi | |
| 8,655,008 B2 * | 2/2014 | Jagne | H04R 1/1091 |
| | | | 381/388 |
| 8,913,777 B2 | 12/2014 | Pelliccio | |
| 9,126,514 B2 | 9/2015 | Soar | |
| 9,232,313 B2 * | 1/2016 | Tracy | B64D 11/0015 |
| 9,327,628 B2 * | 5/2016 | Subat | H04R 5/023 |
| 9,344,013 B2 | 5/2016 | Jarry | |
| 9,421,892 B1 | 8/2016 | Abro | |
| 9,432,716 B2 | 8/2016 | Liu | |
| 9,713,974 B2 | 7/2017 | Mussi | |
| 9,802,519 B2 | 10/2017 | Subat | |
| 10,035,443 B1 | 7/2018 | Sayed | |
| 10,130,123 B2 | 11/2018 | Hatton | |
| 10,207,616 B2 | 2/2019 | James | |
| 10,239,432 B2 * | 3/2019 | Subat | B60N 2/812 |
| 10,252,657 B2 | 4/2019 | Lessard | |
| 10,271,119 B2 | 4/2019 | Fujita | |
| 10,457,179 B1 * | 10/2019 | Kentley-Klay | B60N 2/879 |
| 10,569,685 B2 | 2/2020 | Kakishima | |
| 11,052,801 B2 * | 7/2021 | Winton | H04R 1/025 |
| 2005/0259523 A1 | 11/2005 | Kang | |
| 2006/0220434 A1 | 10/2006 | Schulz | |
| 2008/0048479 A1 | 2/2008 | Haruki | |
| 2008/0107257 A1 | 5/2008 | Matthews | |
| 2008/0252798 A1 | 10/2008 | Vitito | |
| 2010/0148550 A1 | 6/2010 | Kidd | |
| 2012/0299554 A1 | 11/2012 | Kruglick | |
| 2013/0181492 A1 | 7/2013 | Prescott | |
| 2014/0152057 A1 | 6/2014 | Truant | |
| 2015/0381941 A1 | 12/2015 | Watkins | |
| 2017/0154006 A1 | 6/2017 | Tuccinardi | |
| 2017/0207430 A1 | 7/2017 | Conrad | |
| 2018/0029876 A1 * | 2/2018 | Fujita | B60N 2/879 |
| 2019/0001853 A1 | 1/2019 | Durkee | |
| 2019/0061576 A1 | 2/2019 | Tait | |
| 2019/0210500 A1 | 7/2019 | Brown | |
| 2020/0231076 A1 | 7/2020 | Kapolnek | |

FOREIGN PATENT DOCUMENTS

| | | |
|---|---|---|
| CN | 208682687 | 4/2019 |
| DE | 19840444 A1 | 5/1999 |
| DE | 10241132 A1 | 3/2004 |
| DE | 10261898 | 7/2004 |
| DE | 102018102077 A1 | 8/2018 |
| EP | 3002152 A1 | 4/2016 |
| EP | 3319200 B1 | 9/2020 |
| FR | 2696388 | 4/1994 |
| FR | 2768099 | 3/1999 |
| FR | 2768100 | 3/1999 |
| GB | 2224178 A | 4/1990 |
| KR | 20000018331 | 4/2000 |
| WO | 2015198745 | 12/2015 |
| WO | 2017160578 A1 | 9/2017 |

OTHER PUBLICATIONS

Office Action dated Sep. 27, 2019 for U.S. Appl. No. 16/013,183 (pp. 1-8).

Office Action dated Dec. 3, 2019 for U.S. Appl. No. 16/013,183 (pp. 1-9).

German Search Report for German App. No 10 2020 125 006.1 dated Jun. 23, 2021, IDFAUH19011 DE ||, 9 pages, (No English Translation Available).

Office Action dated Dec. 23, 2020 for U.S. Appl. No. 16/581,948, IDFAUH19011 US-U || (pp. 1-10).

Chinese Office Action for Chinese Patent App. No. 201911272587.0 dated Nov. 12, 2021, 14 pages.

* cited by examiner

VEHICLE SEAT HEADREST EQUIPPED WITH AUDIO SPEAKER UNITS

PRIORITY CLAIM

This application claims priority French Patent Application FR 18 73110, filed Dec. 17, 2018, which is expressly incorporated by reference herein.

BACKGROUND

The present disclosure relates to a headrest of a vehicle seat provided with a speaker unit, a method for adjusting the position of the speaker unit of such a headrest, a vehicle seat equipped with such a headrest, as well as an audio system for a vehicle comprising such a headrest.

The field of the present disclosure is the distribution of sound to the occupants of a vehicle, and in particular the distribution of sound from at least one speaker unit positioned directly at the headrest of a vehicle seat in which a vehicle occupant is sitting.

SUMMARY

According to the present disclosure, a headrest for a vehicle seat is comprises a support, configured to receive and support the head of a seat occupant, and, connected to the support.

In illustrative embodiments, the headrest further comprises at least one speaker system comprising a speaker unit comprising a loudspeaker received in an airtight housing and a guide system for guiding the speaker unit relative to the support of the headrest. The guide system is configured so that the speaker unit can transition from a first usage position to a second usage position, and vice versa, the transition from the first usage position to the second usage position, and vice versa, corresponding to a movement combining a translation and a rotation of the speaker unit.

In illustrative embodiments, the guide system may be configured so that, in the first usage position and in the second usage position, the speaker unit is positioned such that the sound emitted by said speaker unit as close as possible to the listening space of the seat occupant, in a normal usage position of the seat. The seat occupant thus hears in a maximized manner the sound emitted by the speaker unit, in the first and in the second usage positions.

In illustrative embodiments, the speaker system may be configured so that, in the first usage position and in the second usage position, said speaker unit does not interfere with the mobility of the seat occupant's head, or hinder his visibility, when his head is resting against the support of the headrest. Thus, neither the guide system nor the speaker unit will be an inconvenience for the seat occupant when his head is resting against the support of the headrest.

In illustrative embodiments, the guide system is configured so that the transition from the first usage position to the second usage position, and vice versa, corresponds to a translational movement of the speaker unit along an axis x combined with a rotation of the speaker unit about an axis z substantially perpendicular to axis x.

In illustrative embodiments, the guide system, configured to ensure the transition from the first usage position to the second usage position, and vice versa, in a movement combining a translation of the speaker unit along axis x and a rotation of the speaker unit about axis z, may comprise: at least one guide rail, a speaker unit support mounted so as to slide relative to at least one guide rail, intended to be in a position close to the support of the headrest when the speaker unit is in the first usage position and a position away from the support of the headrest when the speaker unit is in the second usage position, said speaker unit being connected to the speaker unit support via a pivoting connection having its axis parallel to axis z, a system of cam and cam race respectively integral with the guide rail and the speaker unit or vice versa, configured to change the orientation of the speaker unit when the speaker unit support is slid between said close-to position and said away-from position.

In illustrative embodiments, the guide system comprises two guide rails: an upper rail and a lower rail, parallel, arranged one above the other, and each extending from a same side wall of the support of the headrest towards the front of the headrest, each guide rail having a proximal end located at the support of the headrest and a distal end positioned at a distance from the support of the headrest, as well as a guide pin constituting the cam, at the distal end of each of the guide rails, protruding in a substantially vertical direction, the pins of each of the guide rails pointing towards one another and oriented along a same axis, the airtight housing receiving the loudspeaker having an upper wall and a lower wall parallel to each other, a curved groove constituting the cam race being formed in the upper wall and in the lower wall, the groove of the upper wall being identical and parallel to the groove of the lower wall, the guide pin of the upper rail being received in the groove of the upper wall of the airtight housing and the guide pin of the lower rail being received in the groove of the lower wall of the airtight housing, so as to guide the airtight housing relative to the guide system, simultaneously in translation and in rotation, from the first usage position to the second usage position. The at least one of the ends of the cam race has a reduction in cross-section, so as to form a pressure point when the cam reaches said end. The speaker unit support comprises a casing receiving the speaker unit, said casing being provided with orifices allowing output of the sound emitted by the loudspeaker. The pivoting connection between the speaker unit and the speaker unit support comprises a torque-management hinge between the airtight housing of the speaker unit and the casing. The speaker unit support is slidably guided relative to the guide system by means of a sliding shoe slidably mounted on at least one guide rail of the guide system and fixed to said speaker unit support. The guide system also comprises a stiffening bridge connecting the distal ends of the upper rail and the lower rail. The speaker system comprises a drive system configured to drive the movement of the speaker unit between the first usage position and the second usage position, and vice versa, said drive system being controlled via a control system so as to control the movement of the speaker unit between the first usage position and the second usage position. The drive system comprises an electric motor and a cable comprising a first end and a second end, the first end being connected to the electric motor and the second end to the speaker unit support. The support of the headrest has a substantially vertical plane of symmetry, two speaker systems being symmetrically arranged, one on each side of the support of the headrest, with respect to the plane of symmetry of the support of the headrest. The headrest comprises coordination means, configured so that the movement of each of the speaker units of each of the speaker systems, one on each side of the support of the headrest, is carried out in a coordinated manner.

In illustrative embodiments, a method is provided for adjusting the position of the speaker unit of a headrest according to the present disclosure, wherein: the speaker unit support is moved in translation along said at least one guide rail between said position close to the support of the headrest and said position away from the support of the headrest, such that the speaker unit moves from the first usage position to the second usage position, or the speaker unit support is moved in translation along said at least one guide rail between said position away from the support of the headrest and said position close to the support of the headrest, such that the speaker unit moves from the second usage position to the first usage position.

In illustrative embodiments, a vehicle seat is provided comprising a headrest according to the present disclosure.

In illustrative embodiments, an audio system for a vehicle is provided comprising: a headrest according to the present disclosure. An audio signal generator connected to each of the at least one speaker system of the headrest so as to distribute sound via the speaker unit of the at least one speaker system, in the first usage position and in the second usage position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
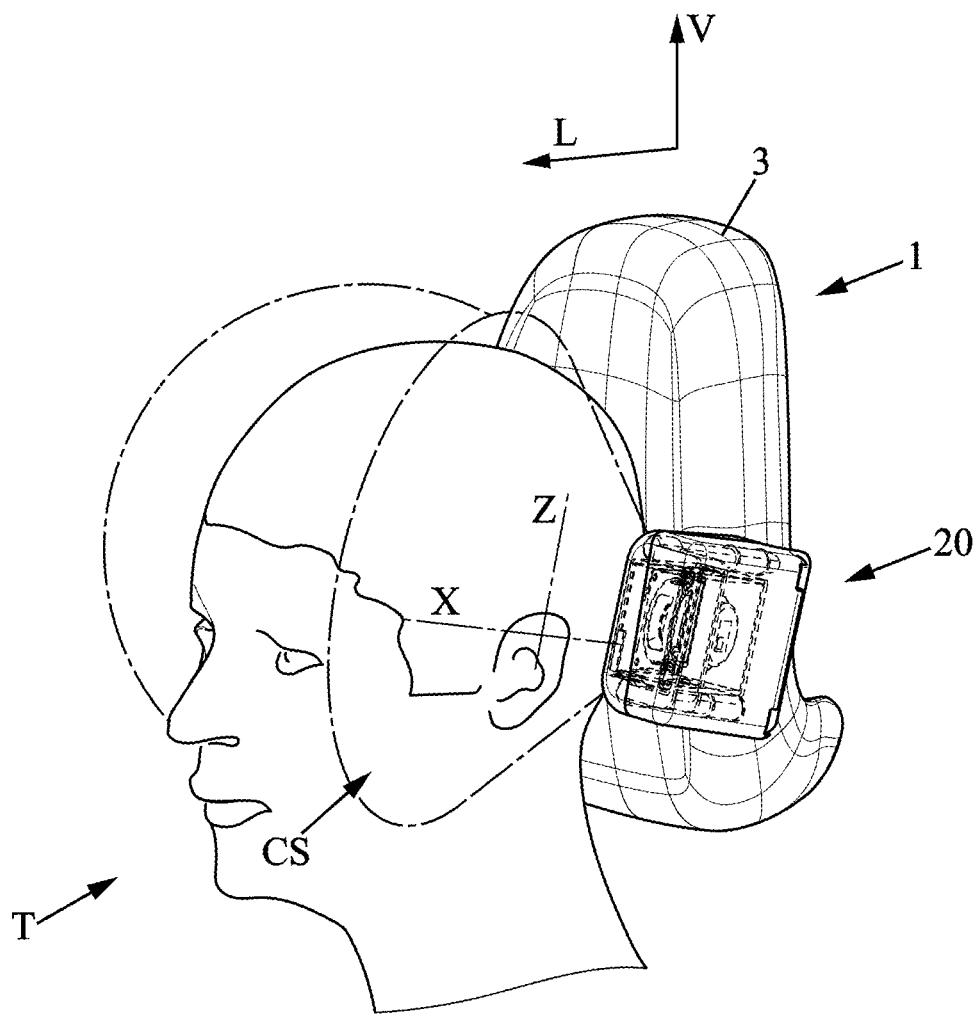
FIG. 1 shows a headrest according to one embodiment of the present disclosure, with the seat occupant in the normal usage position.

A vehicle seat comprises a seating portion configured to receive an occupant. The seating portion has a front edge and a rear edge located opposite the front edge. The seating portion also comprises a backrest which is connected to the rear edge of the seating portion and which extends the seating portion in a plane substantially perpendicular to the plane of the seating portion. The headrest according to the present disclosure is intended to be connected to the backrest of the seat, extending above it as its extension.

Throughout this application, the spatial directions are defined as follows: the longitudinal direction L, represented for example in FIG. 1, corresponds to the direction of movement of the seat receiving the headrest according to the present disclosure, when it is mounted so as to slide relative to the floor of the vehicle by means of at least one rail, so as to ensure its positional adjustment relative to the floor of the vehicle, the vertical direction V, represented for example in FIGS. 1, 2a, and 2b, corresponds to the direction of movement of the headrest according to the present disclosure relative to the backrest of the seat receiving said headrest, when the headrest is mounted so as to slide relative to the seat by means of at least one slider, so as to ensure its positional adjustment relative to the seat.

In addition, throughout the present application, the term substantially longitudinal is understood to mean an orientation relative to the longitudinal direction L that is at an angle less than 30°, which may optionally be zero.

Similarly, the term substantially vertical is understood to mean an orientation relative to the vertical direction V that is at an angle less than 30°, which may optionally be zero.

The present disclosure relates to a headrest 1 for a vehicle seat, comprising a support 3 configured to support the head T of a seat occupant, and, connected to said support 3, at least one speaker system 2, comprising: a speaker unit 20 comprising a loudspeaker 21 received in an airtight housing 22, a guide system 23 for guiding the speaker unit 20 relative to the support 3 of the headrest 1.

According to the present disclosure, said guide system 23 is configured so that the speaker unit 20 can move from a first usage position to a second usage position, and vice versa, the movement from the first usage position to the second usage position, and vice versa, corresponding to a movement combining a translation of the speaker unit 20 and a rotation of the speaker unit 20.

Due to the headrest 1 of the present disclosure, one can quickly and simply transition from the first usage position to the second usage position.

The guide system 23 may be configured such that, in the first usage position and in the second usage position, the speaker unit 20 is positioned so that the sound emitted by said speaker unit 20 passes as close as possible to the listening space of the seat occupant, in a normal usage position of the seat.

The seat occupant thus hears in an optimal manner the sound emitted by the speaker unit 20, in the first and in the second usage position.

Also, the speaker system 2 may be configured such that, in the first usage position and in the second usage position, said speaker unit 20 does not obstruct the mobility of the head T of the seat occupant, nor interfere with his visibility, when his head T is resting against the support 3 of the headrest 1.

Figure 2A:
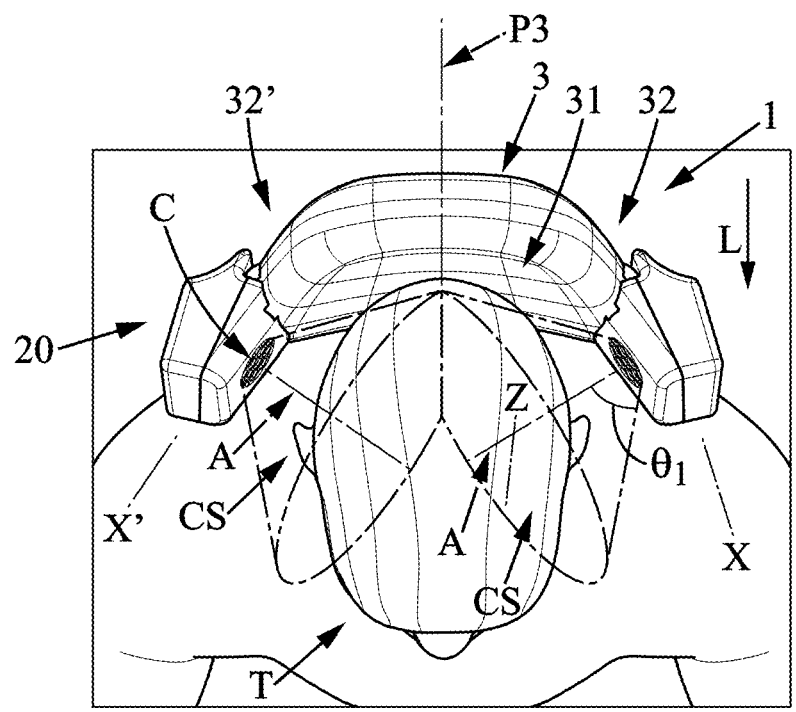
FIG. 2a shows a top view of the headrest of FIG. 1, the speaker unit being in the first usage position.
Figure 2B:
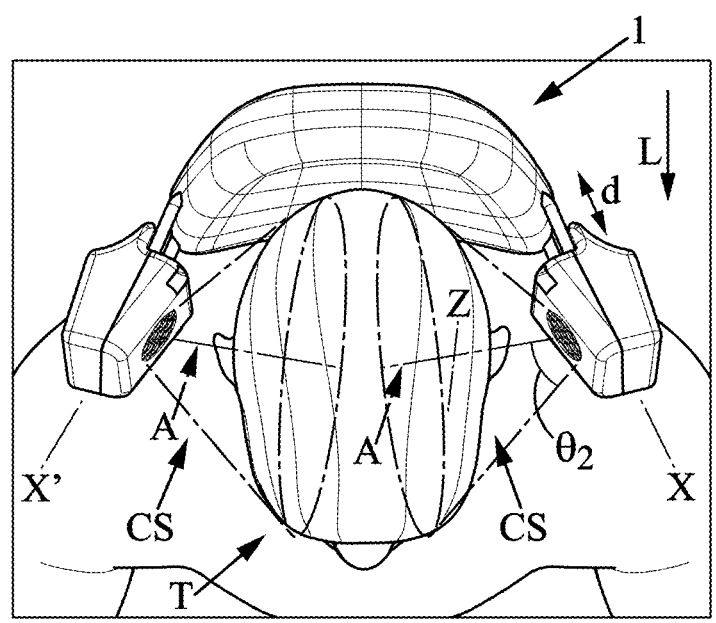
FIG. 2b shows a top view of the headrest of FIG. 1, the speaker unit being in the second usage position.

As can be seen in the exemplary embodiments of FIGS. 1, 2a, and 2b, the headrest 1 comprises a support 3, configured to receive and support the head T of the seat occupant, and in particular the back of the head T, and to which is connected said speaker system 2.

For this purpose, such a support 3 comprises a support wall 31 receiving and supporting the head T, and two side walls 32, 32'.

The support 3 may comprise at least one plane of symmetry P3, such that the side walls 32, 32' are symmetrical relative to this plane of symmetry P3.

The airtight housing 22 is designed to receive the loudspeaker 21, but also to form a soundbox for the sound emitted by said loudspeaker 21, in order to improve the distribution of the sound emitted by the loudspeaker 21.

Therefore, the airtight housing 22 may be made in one or more parts, with sealing means provided between the different parts in order to seal the interior of the airtight housing 22 relative to the exterior.

Also, other electronic elements necessary for the operation of the loudspeaker 21, in particular electrical wires or one or more electronic components, may be positioned inside the airtight housing 22.

According to one embodiment, said guide system 23 is configured so that the transition from the first usage position to the second usage position, and vice versa, corresponds to a translational movement of the speaker unit 20 along an axis x, in particular substantially longitudinal as defined above, combined with a rotation of the speaker unit 20 about an axis z, in particular substantially vertical as defined above, and substantially perpendicular to axis x.

As is more particularly visible in FIGS. 1, 2a, and 2b, axis x may be a substantially longitudinal axis, positioned relative to the support of the headrest 1 so that the speaker system 2 does not obstruct the mobility of the head T of the seat occupant nor interfere with his visibility, when his head is resting against the support 3 of the headrest 1.

As can be seen in the exemplary embodiments of FIGS. 1, 2a, and 2b, the sound waves emitted by the speaker unit 20 extend in a cone CS of axis A passing through the center C of the loudspeaker 21, said axis A extending normal to the membrane of the loudspeaker 21 at its center C.

In particular, and as can be seen in the exemplary embodiments of FIGS. 2a and 2b: in the first usage position, the axis A of the cone CS can pass in proximity to an ear of the head T of the seat occupant, when the latter is in the normal usage position, so that the sound emitted by the speaker unit 20 passes as close as possible to the listening space of the seat occupant, but may also be perceptible to another occupant of the vehicle, in the second usage position, the axis A of the cone CS can pass in proximity to an ear of the head T of the seat occupant, so that the sound emitted by the speaker unit 20 passes as close as possible to the listening space of the seat occupant, but may possibly be less perceptible to another occupant of the vehicle in comparison to the first usage position.

The sound emitted by the speaker unit 20 is therefore perceived by the seat occupant in each of the first and second usage positions, but may also be less perceptible to another occupant of the vehicle in the second usage position in comparison to the first usage position.

The second usage position may even be defined so that the sound emitted by the speaker unit 20 passes as close as possible to the listening space of the seat occupant but is not at all audible to another occupant of the vehicle. As a result, the seat occupant is within a sound bubble, isolated from the outside.

As can be seen in the exemplary embodiments of FIGS. 2a and 2b, axis z of the rotation of the speaker unit 20 between the first and second usage positions is not in a fixed position during the translational movement of the speaker unit 20 along axis x. Likewise, the radius of the rotation of the speaker unit 20 about axis z is not constant during the translational movement of the speaker unit 20 along axis x.

According to one embodiment, the guide system 23 configured to ensure the transition from the first usage position to the second usage position, and vice versa, in a movement combining a translation of the speaker unit 20 along axis x and a rotation of the speaker unit 20 about axis z, comprises: at least one guide rail 24 oriented along said axis x, a speaker unit support 25 mounted so as to slide relative to the guide rail 24, intended to be in a position close to the support 3 of the headrest 1 when the speaker unit 20 is in the first usage position and a position away from the support of the headrest 1 when the speaker unit 20 is in the second usage position, said speaker unit 20 being connected to the speaker unit support 25 via a pivoting connection 26 having its axis A26 parallel to axis z, a system of cam 27 and cam race 28, respectively integral with the guide rail 24 and speaker unit 20 or vice versa, configured to change the orientation of the speaker unit 20 when the speaker unit support 25 is slid between said close-to position and said away-from position.

Thus, due to this arrangement of the present disclosure, the driving, solely in translation along axis x, of the speaker unit support 25 relative to the guide rail 24 drives the translation along axis x and the combined rotation about axis z of the enclosure unit 20 relative to the guide rail 24 so as to change the orientation of the speaker unit 20 from the first usage position to the second usage position, or vice versa, the cam race 28 being configured to obtain the rotation of the speaker unit 20 about axis z when the speaker unit support 25, and therefore the speaker unit 20, is moved in translation along said axis x, and the pivoting connection 26 ensuring the transmission of the translational force from the speaker unit support 25 to the speaker unit 20.

Figure 9:
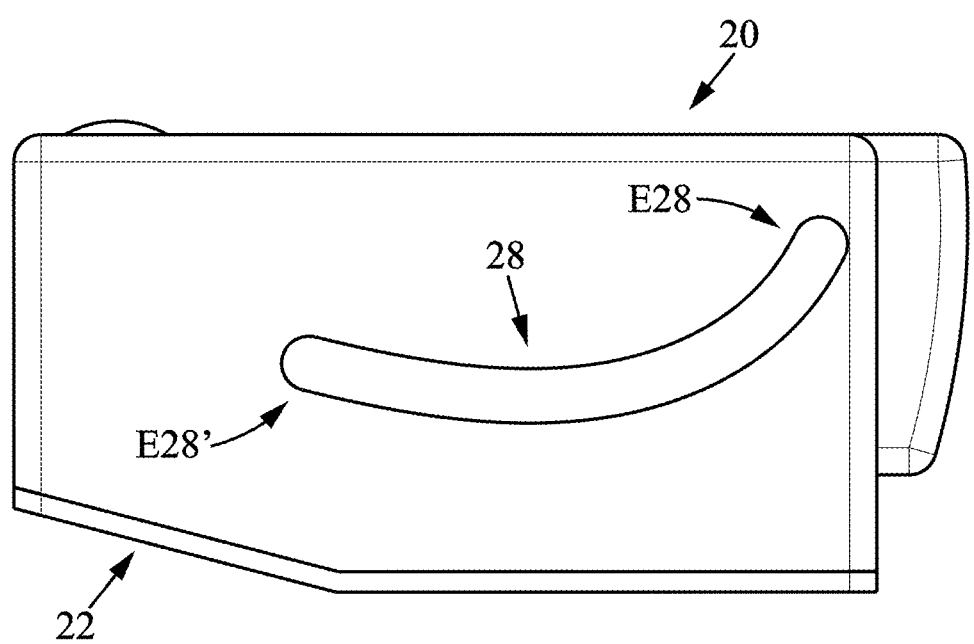
FIG. 9 shows a top view of the speaker unit of the headrest of FIG. 1.

As explained above, and as can be seen in the exemplary embodiments in FIGS. 2a and 2b, the axis of rotation z of the speaker unit 20 during its movement in translation along axis x is not fixed and its position during the translational movement of the speaker unit 20 along axis x depends on the shape of the cam race 28, as shown in the exemplary embodiment of FIG. 9. Similarly, the radius of the rotation of the speaker unit 20 about axis z, variable during the translational movement of the speaker unit 20 along axis x, also depends on the shape of the cam race 28.

The transition from the first usage position to the second usage position may for example correspond to a translation of the speaker unit 20 along axis x by a distance d and a rotation of the speaker unit 20 about axis z of angle THETA.

The distance d may for example be comprised between 20 and 50 mm, preferably between 30 and 40 mm, and the angle THETA may for example be comprised between 20° and 40°, preferably between 20° and 30°.

A value of the angle THETA combined with such a value of the distance d makes it possible to obtain the two configurations when moving from the first usage position to the second usage position.

As can be seen in the exemplary embodiments of FIGS. 2a and 2b, the value of the angle THETA of the rotation of the speaker unit 20 between the first usage position and the second usage position corresponds to the difference between the orientation THETA1 of the speaker unit 20 about axis z relative to axis x in the first usage position and the orientation THETA2 of the speaker unit 20 about axis z relative to axis x in the second usage position.

The orientation of the speaker unit 20 about axis z corresponds here to the orientation of the axis A of the sound cone CS emitted by said speaker unit 20.

One can thus define: THETA=THETA2−THETA1;

In order to reduce the amount of sound emitted by the speaker unit 20 and perceived by another occupant of the vehicle, and therefore the portion of sound intercepted by the head T of the seat occupant or the headrest 1, and in particular the headrest support 3, it may be advantageous to increase the value of the angle THETA of the rotation of the speaker unit 20 between the first and second usage position.

According to one embodiment, said guide system 23 comprises two guide rails 24: an upper rail 24 and a lower rail 24, parallel, arranged one above the other, in particular in a substantially vertical direction, and each extending from the same side wall 32 of the support 3 of the headrest 1, substantially towards the front of the headrest 1, each guide rail 24 having a proximal end E24 located at the support of the headrest and a distal end E24' positioned at a distance from the support of the headrest, as well as a guide pin 27 forming the cam 27, at the distal end E24' of each of the guide rails 24, protruding in a substantially vertical direction, the pins 27 of each of the guide rails 24 pointing towards one another and being oriented along a same axis.

Throughout the present application, the front of the headrest 1 corresponds to the side facing the seat occupant when his head T is resting normally against the support 3 of the headrest 1.

According to this embodiment, the airtight housing 22 receiving the loudspeaker 21 comprises an upper wall P22$s$ and a lower wall P22$i$, parallel to each other, a groove 28, of curved shape constituting the cam race 28, being formed on the upper wall P22$s$ nd on the lower wall P22$i$, the groove 28 of the upper wall P22$s$ being identical and parallel to the groove 28 of the lower wall P22$i$.

According to this embodiment, the guide pin 27 of the upper rail 24 is received in the groove 28 of the upper wall P22$s$ of the airtight housing 22, and the guide pin 27 of the lower rail 24 is received in the groove 28 of the lower wall P22$i$ of the airtight housing 22, so as to guide the airtight housing 22 relative to the guide system 23, simultaneously in translation and rotation, from the first usage position to the second usage position.

Thus, due to this arrangement of the present disclosure, the speaker unit 20 is guided at the upper wall P22$s$ and lower wall P22$i$ of the airtight housing, which improves and stiffens such guidance.

Figure 3:
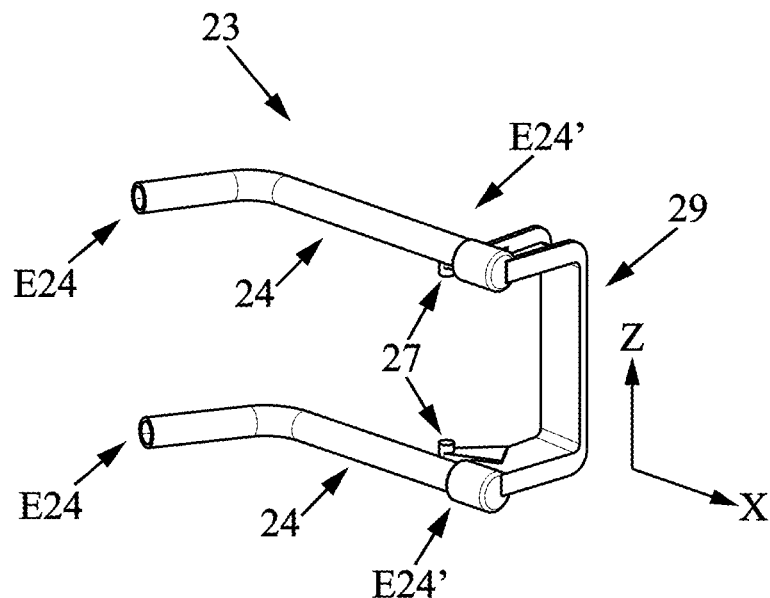
FIG. 3 shows a detailed view of the guide rails of the headrest of FIG. 1.

As is more particularly visible in the embodiment of FIG. 3, the guide pins 27 may extend along an axis parallel to said axis z.

Said substantially vertical direction in which the upper rail 24 and lower rail 24 extend one above the other may advantageously also be parallel to axis z.

The guide rails 24 may be implemented in the form of a tube, in particular hollow, or even as sections of square cross-section, in particular in order to allow the passage of electrical wires inside, connected to the speaker unit 20 to enable its operation.

To simplify the implementation of the guide rails 24, these may be made of plastic, natural or filled. In order to increase their rigidity, overmolding of rigid plastic may also be provided.

The guide pins 27 may be formed as one piece with each of the guide rails 24, or may be a separate part fixed to said guide rail 24.

As can be seen in the embodiment of FIG. 9, the groove 28 may be of complex shape with one or more sections defining a portion of a circle whose radius and center correspond to the radius and center of the rotation of the speaker unit 20 about axis z, varying during the translational movement of the speaker unit 20 along axis x. Thus, the shape of the groove 28 is determined according to the desired movement of the speaker unit 20 relative to the guide system 23 when it moves between the first usage position and the second usage position.

According to one embodiment, at least one of the ends E28, E28' of the cam race 28 comprises a reduction in cross-section, so as to form a pressure point when the cam 27 reaches said end.

Such a reduction in cross-section can be dimensioned to ensure the stopping of said guide pin 27 in translation relative to the cam race 28, in order to immobilize the speaker unit 20 relative to the guide rails 24, in the first usage position or in the second usage position.

The cross-section of the cam race 28 may be constant along its entire length, except for said reduction or reductions in cross-section.

The airtight housing 22, and in particular the upper wall P22$s$ or the lower wall P22$i$, at least at said groove 28, may be able to deform elastically to ensure the passage then the movement of the guide pin 27, and for this purpose may be made of thermoplastic material.

According to one embodiment, the speaker unit support 25 comprises a casing CA25 receiving the speaker unit 20, said casing CA25 being provided with orifices O25 allowing output of the sound emitted by the loudspeaker 21.

Such a casing CA25 advantageously makes it possible to isolate the speaker unit 20 from the exterior, in order to protect it from dust for example, in particular to prevent damage to the loudspeaker 21.

Also, if said speaker system 2 is configured to be moved manually by an occupant of the seat receiving the headrest 1, the casing CA25 facilitates manipulation of the speaker unit 20 by the seat occupant, in order to transition from the first usage position to the second usage position or vice versa, who only needs to exert a translational force along said axis x on the casing CA25, without exerting force directly on the speaker unit 20 which could damage it, so as to ensure the transition of the speaker unit 20 from the first usage position to the second usage position or vice versa.

Figure 4:
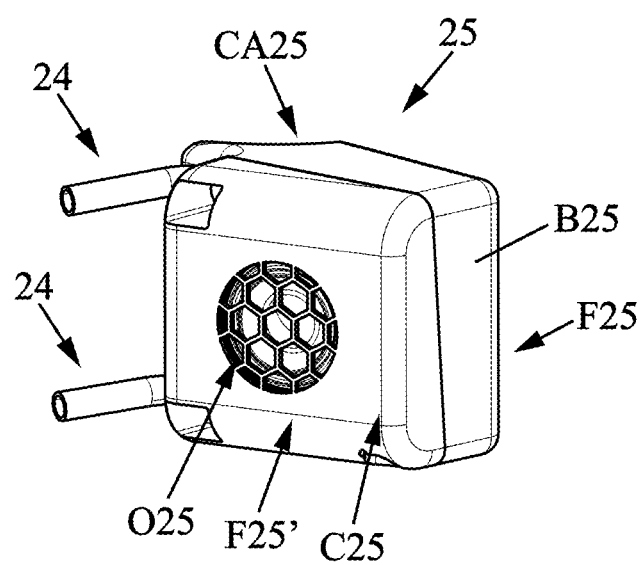
FIG. 4 shows a detailed view of the speaker system of the headrest of FIG. 1.
Figure 7:
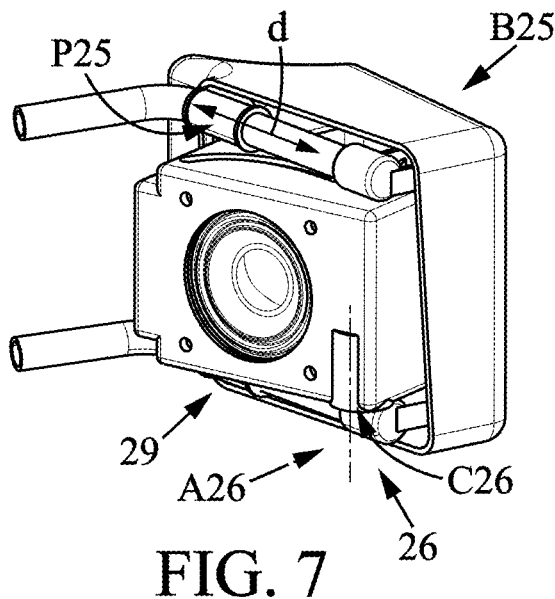
FIG. 7 shows a detailed view of the speaker system of the headrest of FIG. 1, in which a portion of the casing of the speaker unit support has been removed and the angle between the speaker unit support and the speaker unit has been pivoted.
Figure 8:
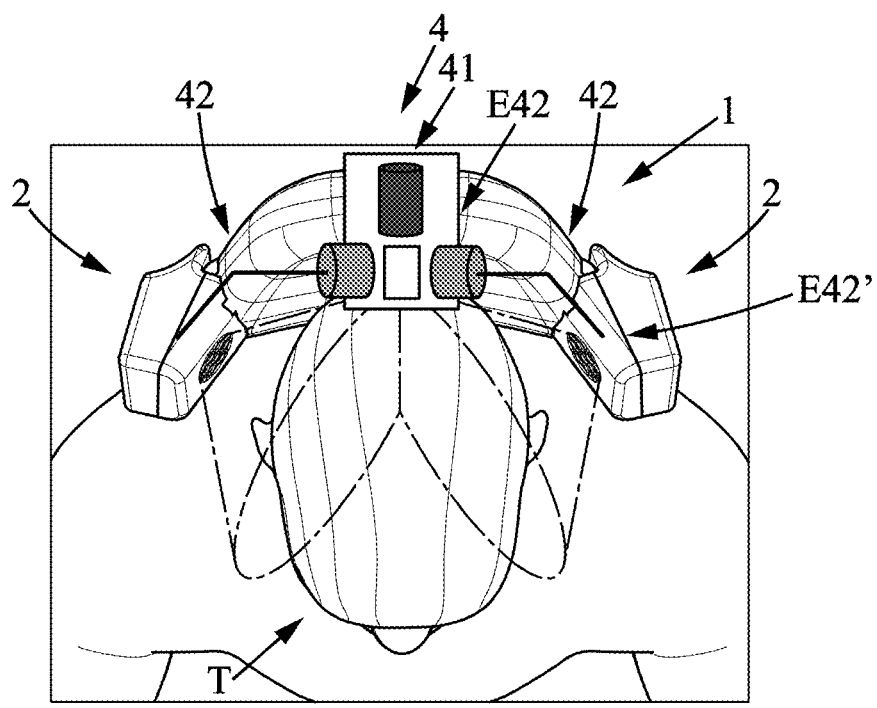
FIG. 8 shows a top view of the speaker system of the headrest of FIG. 1, in which the drive system is schematically represented.

As can be seen more particularly in the exemplary embodiments of FIGS. 4 and 7, the casing CA25 may be made in two parts C25, B25, fixed to each other, for example by fastening means, or may be configured to deform elastically to ensure their snap-fit assembly.

The casing CA25 may thus comprise a housing B25 provided to cover the back of the airtight housing 22, in other words the wall of the airtight housing 22 not receiving the loudspeaker 21, and a cover C25 provided to cover the front of the airtight housing 22, in other words the wall of the airtight housing 22 receiving the loudspeaker 21.

The orifices O25 may advantageously be formed in the cover C25 of the casing CA25.

According to one embodiment, the pivoting connection 26 between the speaker unit 20 and the speaker unit support 25 comprises a torque-management hinge C26 between the airtight housing 22 of the speaker unit 20 and the casing CA25.

Such a torque-management hinge C26 advantageously allows transmitting the force received by the speaker unit support 25, for driving it in translation, to the speaker unit 20 and in particular to the airtight housing 22, while reducing the torque transmitted to the airtight housing 22 by the speaker unit support 25 at the pivoting connection 26, to a desired value, so that it is not damaged.

Figure 5:
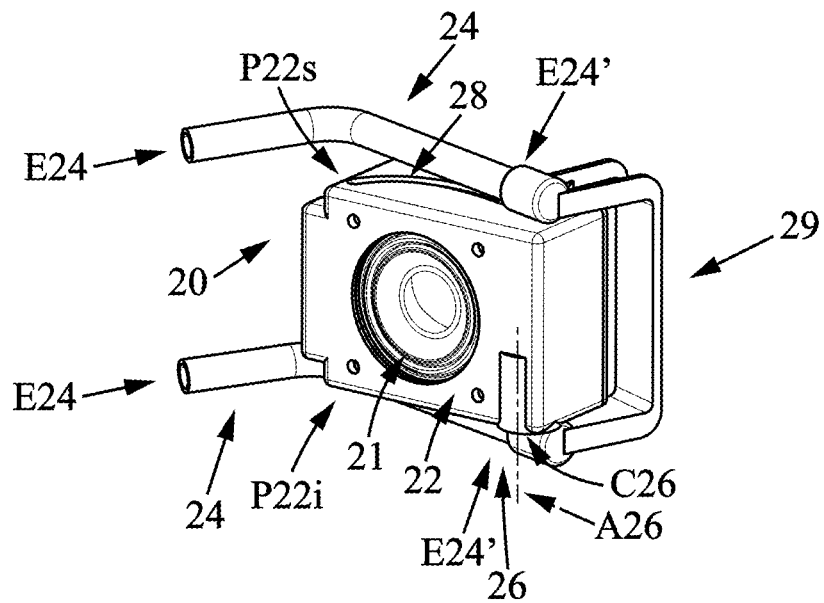
FIG. 5 shows a detailed view of the speaker system of FIG. 4, without the speaker unit support.

As can be seen in the embodiment of FIG. 5, said torque-management hinge C26 may be received by the casing CA25, and in particular in a corresponding recess provided in the cover C25 of the casing CA25. A recess for receiving said torque-management hinge C26 may also be provided on said airtight housing 22, and in particular at the lower wall P22$i$ of the airtight housing 22.

According to one embodiment, the speaker unit support 25 is slidably guided relative to the guide system 23 by means of a sliding shoe P25 slidably mounted on at least one guide rail 24 of the guide system 23 and fixed to said speaker unit support 25.

As can be seen in the embodiment of FIG. 7, said sliding shoe P25 can be fixed to the casing CA25, and in particular to the housing B25 of said casing CA25.

The shoe P25 may have a cross-section corresponding to that of the guide rail 24, to allow the guide rail 24 to slide within the shoe P25.

Figure 6:
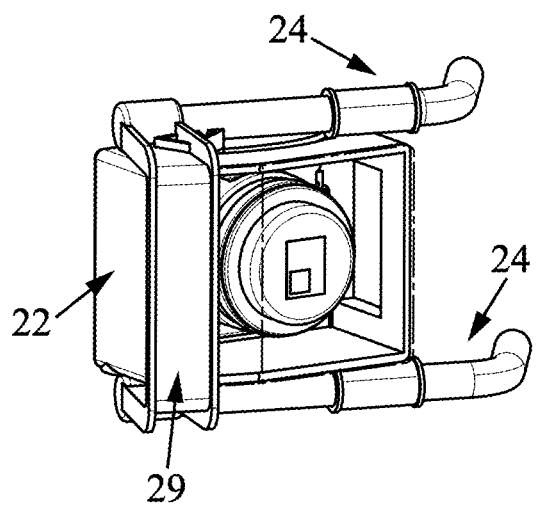
FIG. 6 shows a back view of the speaker system of FIG. 5.

In order to improve the guiding of the speaker unit support 25 with respect to the guide system 23, and as is more particularly visible in the embodiments of FIGS. 6 and 7, two shoes P25 may be provided which respectively engage with the upper rail 24 and the lower rail 24.

According to one embodiment, the guide system also comprises a stiffening bridge 29 connecting the distal ends E24' of the upper rail 24 and the lower rail 24.

Such a stiffening bridge 29 makes it possible to ensure a rigid connection between the upper rail 24 and the lower rail 24, so as to improve the guidance of the speaker unit 20 with respect to the guide rails 24.

As can be seen in the embodiment of FIG. 3, the at least one guide pin 27 may be formed on said stiffening bridge 29, and preferably the two guide pins 27.

The stiffening bridge 29 may be formed as one piece with the upper rail 24 and with the lower rail 24, or alternatively may be formed as a separate part fixed to the upper rail 24 and to the lower rail 24.

To facilitate implementation of the guide system 23, and in particular in the case where the guide rail or rails 24 are made of thermoplastic material, said stiffening bridge may also be made of thermoplastic material, for example Polypropylene (PP), Polyethylene (PE), Polyamide (PA), Acrylonitrile butadiene styrene-Polycarbonate (ABS-PC).

According to one embodiment, the speaker system 2 may be configured so that the movement of the speaker unit 20 is driven manually between the first usage position and the second usage position, by the occupant of the vehicle seat.

This arrangement simplifies the implementation of the headrest 1 according to the present disclosure, in that it is not necessary to provide additional means to ensure the movement of the speaker unit 20 along the guide system 23.

The seat occupant may for example grip the speaker unit 20, and in particular the speaker unit support 25, and cause it to move between the first usage position and the second usage position. For example, the speaker system 2 may be configured so that the movement of the speaker unit 20 between the first usage position and the second usage position uses the user to exert a force comprised between 10 and 50 N.

According to one embodiment, the speaker system 2 comprises a drive system 4 configured for moving the speaker unit 20 from the first usage position to the second usage position, and vice versa, said drive system 4 being controlled via a control system so as to control the movement of the speaker unit 20 between the first usage position and the second usage position.

This arrangement facilitates the use of the headrest 1 of the present disclosure, in that the seat occupant does not have to exert any physical force to cause the speaker unit 20 to move along the guide system 23, and can obtain precise positioning of the speaker unit 20 along the guide system 23.

An actuating means (not shown) connected to the control system may be provided for controlling the movement of the speaker unit 20.

Sensors may be provided, for example at the guide system 23, for detecting the position of the speaker unit 20 along the guide system 23, and to enable the driving system 4 to be controlled according to said position of the speaker unit 20.

According to one embodiment, the drive system 4 comprises an electric motor 41 and a cable 42 comprising a first end E42 and a second end E42', the first end E42 being connected to the electric motor and the second end E42' to the speaker unit support 25.

The electric motor 41 may comprise a pulley (not shown) fixed on its drive shaft, configured to receive the winding cable 42.

The cable 42 may be a semi-rigid cable, in order to be able to cause the movement of the speaker unit 20 along the guide system 23 in both directions along axis x. In order to control the speed of movement of the speaker unit 20 along the guide system 23, as well as possibly the force transmitted to the speaker unit 20 and possibly to the speaker unit support 25, the motor 4 may be coupled with a gearmotor (not shown).

According to one embodiment, the speaker system 2 may comprise an active noise cancellation system (ANC), said ANC system comprising a first microphone positioned on a first side face F25 of the casing CA25, oriented away from the head T of the seat occupant in the normal usage position, and a second microphone positioned on a second side face F25' of the casing CA25, oriented towards the head T of the seat occupant in the normal usage position, as well as a control means configured to receive the signal received by the first microphone and second microphone and to deliver an attenuation signal to the loudspeaker 21, in order to emit a sound wave to reduce the noise perceived by said seat occupant.

The acronym ANC corresponds to the initials "Active Noise Cancellation," which is the English term used to designate an active noise reduction system.

Such a system is provided in order to reduce sound, in a particularly effective manner, that is not the sound emitted by a speaker unit being used, particularly in comparison to a passive noise reduction system configured to reduce noise by forming an obstacle for the propagation of sound.

To do this, the ANC system receives a signal corresponding to sound external to that emitted by the speaker unit 20, namely the sound captured by the first microphone, and a signal corresponding to the sound emitted by the speaker unit 20 and heard by the seat occupant, namely the sound captured by the second microphone.

The control means will thus generate a signal to cancel the sound external to the speaker unit 20, while keeping the signal of the sound intended to be emitted by the speaker unit 20, the signal thus generated corresponding to the signal captured by the first microphone, of which the sign of the amplitude is inverted, but from which is subtracted the signal corresponding to the sound emitted by the speaker unit 20, so that the sound emitted therefrom is properly perceptible to the seat occupant. Said control means may for example comprise electronic equipment which executes software, said electronic equipment advantageously being placed on the seat or elsewhere in the vehicle.

Such a signal may advantageously be emitted by the loudspeaker 21 of the speaker unit 20, or alternatively by a second dedicated loudspeaker.

According to one embodiment, the support 3 of the headrest 1 comprises a plane of symmetry P3, substantially vertical, two speaker systems 2 being arranged one on each side of the support 3 of the headrest 1, symmetrically relative to the plane of symmetry P3 of the support 3 of the headrest 1.

This arrangement of the present disclosure makes it possible to send sound via each of the speaker systems 2 towards each ear of the seat occupant, which reinforces the immersion of the seat occupant in the sound environment, and all the more so as each of the speaker systems 2, combined with the support 3 of the headrest 1, constitutes a passive noise reduction element, blocking the propagation of external sound waves, in other words waves other than those emitted by each of the speaker units 20.

All the arrangements described above concerning a speaker system 2 may be applied to one or the other of the two speaker systems 2, in any conceivable combination.

As can be seen in the embodiment of FIGS. 2a and 2b, each of the speaker units 20 of each of the audio systems 2 moves in translation respectively along an axis x and along an axis x', in particular substantially longitudinal. These axes x and x' may for example be parallel to each other, or preferably not parallel to each other.

According to one embodiment of the present disclosure, the headrest 1 comprises coordination means, configured so that the movement of each of the speaker units 20 of each of the speaker systems 20, one on each side of the support 3 of the headrest 1, is carried out in a coordinated manner.

In particular, in the case where a drive system 4 is provided, with an electric motor 41 and a cable 42 as described above, a single electric motor 41 may be provided to which are connected the first end E42 of two cables 42, one for each of the speaker systems 2.

The electric motor 41 may be a dual-output motor, with for example each receiving a pulley to which each of the ends E42 of the cables 42 are respectively attached, and onto which each of the cables 42 is respectively wound. The adjustment method according to the disclosure is particularly simple and fast to implement, and provides precise positioning of the speaker unit 20 in the first usage position and/or in the second usage position.

In particular, if the speaker unit support 25 comprises a casing CA25, as described above, and said speaker system 2 is configured to be moved manually by an occupant of the seat receiving the headrest 1, then the seat occupant only needs to exert translational force along said axis x on the casing CA25 to ensure the transition from the first usage position to the second usage position, or vice versa.

The present disclosure also relates to a vehicle seat comprising a headrest 1 according to one of the embodiments described above.

Such a vehicle seat may in particular be a seat of a motor vehicle, aircraft, railway vehicle, or ship.

Such a headrest 1 could also be used on any type of seat providing a headrest with a support 3 for the head T of the seat occupant, even if it is not intended for a vehicle.

The present disclosure relates to an audio system for a vehicle, comprising: a headrest 1 according to one of the embodiments described, an audio signal generator connected to each of the at least one speaker system 2 of the headrest 1, so as to distribute sound via the speaker unit 20 of the at least one speaker system 2, in the first usage position and in the second usage position.

The audio signal generator may comprise any known means of generating an audio signal, for example such as a CD player, a DVD or Blu-ray player, a computer, a mobile phone, etc.

The audio signal generator may be connected to each of the at least one speaker system 2 of the headrest 1 via a wired link or, advantageously, to simplify the design of a such an audio system for a vehicle, via a wireless link, for example such as an infrared link, a Bluetooth® link, or an NFC (Near Field Communication) link.

The audio signal generator may be a mobile telephone, in particular to allow the seat occupant to conduct a telephone conversation via the speaker system 2 of the headrest 1 according to the present disclosure.

For this purpose, a microphone (not shown) may be provided, also connected to said mobile phone, for example arranged at the second side face F25' of the casing CA25, to capture the sound of the voice of the seat occupant in order to enable him to conduct a telephone conversation without any additional element.

A vehicle seat headrest comprising a support configured to receive and support the head of a seat occupant, to which is connected at least one speaker unit configured to move from a first usage position to a second usage position, in each of which the speaker unit is positioned so that the sound from said speaker unit is heard in an optimal manner by the seat occupant, in a normal usage position of the seat, without causing any discomfort to the seat occupant, when his head is resting against the support of the headrest.

In particular, in the first usage position, the speaker unit is positioned so that the sound emitted is heard in an optimal manner by the seat occupant, in a normal usage position of the seat, but can also be heard by another occupant of the vehicle; and in the second usage position, the speaker unit is positioned differently from the first usage position, and such that the sound emitted is heard in an optimal manner by the seat occupant, in a normal usage position of the seat, but the sound emitted by said speaker unit is less or not at all audible to another occupant of the vehicle in comparison to the first usage position.

A headrest for a vehicle seat, comprising a support, configured to receive and support the head of a seat occupant, and, connected to said support, at least one speaker system comprising: a speaker unit comprising a loudspeaker received in an airtight housing, a guide system for guiding the speaker unit relative to the support of the headrest, said guide system being configured so that the speaker unit can transition from a first usage position to a second usage position, and vice versa, the transition from the first usage position to the second usage position, and vice versa, corresponding to a movement combining a translation and a rotation of the speaker unit.

The guide system may be configured so that, in the first usage position and in the second usage position, the speaker unit is positioned such that the sound emitted by said speaker unit as close as possible to the listening space of the seat occupant, in a normal usage position of the seat.

The seat occupant thus hears in an optimal manner the sound emitted by the speaker unit, in the first and in the second usage positions.

Also, the speaker system may be configured so that, in the first usage position and in the second usage position, said speaker unit does not interfere with the mobility of the seat occupant's head, or hinder his visibility, when his head is resting against the support of the headrest.

Thus, neither the guide system nor the speaker unit will be an inconvenience for the seat occupant when his head is resting against the support of the headrest.

The guide system is configured so that the transition from the first usage position to the second usage position, and vice versa, corresponds to a translational movement of the speaker unit along an axis x combined with a rotation of the speaker unit about an axis z substantially perpendicular to axis x, the guide system, configured to ensure the transition from the first usage position to the second usage position, and vice versa, in a movement combining a translation of the speaker unit along axis x and a rotation of the speaker unit about axis z, may comprise: at least one guide rail, a speaker unit support mounted so as to slide relative to at least one guide rail, intended to be in a position close to the support of the headrest when the speaker unit is in the first usage position and a position away from the support of the headrest when the speaker unit is in the second usage position, said speaker unit being connected to the speaker unit support via a pivoting connection having its axis parallel to axis z, a system of cam and cam race respectively integral with the guide rail and the speaker unit or vice versa, configured to change the orientation of the speaker unit when the speaker unit support is slid between said close-to position and said away-from position; said guide system comprises two guide rails: an upper rail and a lower rail, parallel, arranged one above the other, and each extending from a same side wall of the support of the headrest towards the front of the headrest, each guide rail having a proximal end located at the support of the headrest and a distal end positioned at a distance from the support of the headrest, as well as a guide pin constituting the cam, at the distal end of each of the guide rails, protruding in a substantially vertical direction, the pins of each of the guide rails pointing towards one another and oriented along a same axis, the airtight housing receiving the loudspeaker having an upper wall and a lower wall parallel to each other, a curved groove constituting the cam race being formed in the upper wall and in the lower wall, the groove of the upper wall being identical and parallel to the groove of the lower wall, the guide pin of the upper rail being received in the groove of the upper wall of the airtight housing and the guide pin of the lower rail being received in the groove of the lower wall of the airtight housing, so as to guide the airtight housing relative to the guide system, simultaneously in translation and in rotation, from the first usage position to the second usage position; at least one of the ends of the cam race has a reduction in cross-section, so as to form a pressure point when the cam reaches said end; the speaker unit support comprises a casing receiving the speaker unit, said casing being provided with orifices allowing output of the sound emitted by the loudspeaker; the pivoting connection between the speaker unit and the speaker unit support comprises a torque-management hinge between the airtight housing of the speaker unit and the casing; the speaker unit support is slidably guided relative to the guide system by means of a sliding shoe slidably mounted on at least one guide rail of the guide system and fixed to said speaker unit support; the guide system also comprises a stiffening bridge connecting the distal ends of the upper rail and the lower rail; the speaker system comprises a drive system configured to drive the movement of the speaker unit between the first usage position and the second usage position, and vice versa, said drive system being controlled via a control system so as to control the movement of the speaker unit between the first usage position and the second usage position; the drive system comprises an electric motor and a cable comprising a first end and a second end, the first end being connected to the electric motor and the second end to the speaker unit support; the support of the headrest has a substantially vertical plane of symmetry, two speaker systems being symmetrically arranged, one on each side of the support of the headrest, with respect to the plane of symmetry of the support of the headrest; the headrest comprises coordination means, configured so that the movement of each of the speaker units of each of the speaker systems, one on each side of the support of the headrest, is carried out in a coordinated manner.

According to another aspect, a method is provided for adjusting the position of the speaker unit of a headrest according to the present disclosure, wherein: the speaker unit support is moved in translation along said at least one guide rail between said position close to the support of the headrest and said position away from the support of the headrest, such that the speaker unit moves from the first usage position to the second usage position, or the speaker unit support is moved in translation along said at least one guide rail between said position away from the support of the headrest and said position close to the support of the headrest, such that the speaker unit moves from the second usage position to the first usage position.

According to another aspect, a vehicle seat is provided comprising a headrest according to the present disclosure.

According to another aspect, an audio system for a vehicle is provided comprising: a headrest according to the present disclosure, an audio signal generator connected to each of the at least one speaker system of the headrest so as to distribute sound via the speaker unit of the at least one speaker system, in the first usage position and in the second usage position.

One or more speaker units may be positioned at the headrest of a seat in order to distribute sound to the occupant of this seat. The sound is thus distributed in proximity to the listening space of the occupant, so that he or she can hear it in an optimal manner.

The listening space of the seat occupant is defined as the area of the occupant's head located by each of the occupant's ears.

A sound heard in an optimal manner is defined as a sound that is clearly heard and distinct from other surrounding sounds.

To ensure that the sound emanating from a speaker unit is heard by the seat occupant when he is in the normal usage position of the seat, in other words seated with his back resting against the backrest and his head resting against a support of the headrest, it may be provided to position said speaker unit relative to the support of the headrest so that the sound emitted by said speaker unit passes in proximity to the listening space of the seat occupant.

In addition, it may also be provided that said speaker unit is movable relative to the support of the headrest, with which it is integral, so as to be able to move from a retracted position, in which said speaker unit is positioned behind the skull of the seat occupant, the sound emitted by said speaker unit not being heard by the seat occupant because it does not pass in proximity to the listening space of the seat occupant, and may possibly be inactive in this retracted position, to a usage position in which said speaker unit is positioned so that the sound emitted by said speaker unit passes in proximity to the listening space of the seat occupant, such that the sound emitted by said speaker unit is heard by the seat occupant.

To move from the retracted position to the usage position, a guide system is generally provided for guiding the speaker unit relative to the support of the headrest.

It may be useful to use said speaker unit in a plurality of usage positions, in each of which the speaker unit is positioned so that the sound emitted by said speaker unit is heard in an desired manner by the seat occupant, and so that it is not uncomfortable for the seat occupant when his head is resting against the support of the headrest.

Also, depending on the position and orientation of the speaker unit, the sound, in addition to being heard in a desired manner by the seat occupant, may also propagate in the passenger compartment of the vehicle, particularly if no obstacle prevents its travel, and be heard by a vehicle occupant other than the seat occupant.

In some cases, the sound emitted by one or more speaker units connected to the support of the headrest of a vehicle seat may be heard only by the seat occupant, without another vehicle occupant being able to hear it, for example if it concerns a telephone conversation or simply if the other occupant does not wish to be disturbed.

Thus, the speaker unit of the headrest may be used in a first usage position, with the speaker unit positioned so that the sound emitted is heard in an optimal manner by the headrest occupant when he is in a normal usage position of the seat, but is also audible to another occupant of the vehicle, for example in order to listen to music or to hear the sound of a film together; but also to use this same speaker unit in a second usage position, with the speaker unit oriented so that the sound emitted is heard in an optimal manner by the seat occupant, in a normal usage position of the seat, but this sound is less or not at all audible to another occupant of the vehicle, for example in order to be able to conduct a telephone conversation or listen to music or watch a movie alone without disturbing another occupant of the vehicle.

Other devices do not allow their use in a plurality of usage positions in each of which the speaker unit is positioned so that the sound emitted by said speaker unit is heard in a desired manner by the seat occupant, and so that the mobility of the seat occupant's head is not obstructed, and his visibility is not interfered with, when his head is resting against the support of the headrest, and in particular in the first and second usage positions described above.

The invention claimed is:

1. A headrest for a vehicle seat comprising
a support configured to receive and support the head of a seat occupant, and, connected to the support, at least one speaker system comprising:
a speaker unit comprising a loudspeaker received in an airtight housing,
a guide system for guiding the speaker unit relative to the support of the headrest,
the guide system being configured so that the speaker unit can transition from a first usage position to a second usage position, and vice versa, the transition from the first usage position to the second usage position, and vice versa, corresponding to a movement combining a translation of the speaker unit and a rotation of the speaker unit,
wherein the guide system is configured so that the transition from the first usage position to the second usage position, and vice versa, corresponds to a translational movement of the speaker unit along a first axis combined with a rotation of the speaker unit about a second axis substantially perpendicular to the first axis, and
wherein the guide system is configured to ensure the transition from the first usage position to the second usage position, and vice versa, in a movement combining a translation of the speaker unit along the first axis and a rotation of the speaker unit about the second axis, and wherein the guide system comprises: at least one guide rail oriented along the first axis, a speaker unit support mounted so as to slide relative to the guide rail, positioned a first distance to the support of the headrest when the speaker unit is in the first usage position and a second distance from the support of the headrest, greater than the first distance, when the speaker unit is in the second usage position, the speaker unit is connected to the speaker unit support via a pivoting connection having a third axis parallel to the second axis, and a system of cam and cam race respectively integral with the guide rail and the speaker unit or vice versa, the system of cam and cam race configured to change the orientation of the speaker unit when the speaker unit support is slid between the first usage position and the second usage position.

2. The headrest of claim 1, wherein the guide system comprises two guide rails: an upper rail and a lower rail, the upper rail and the lower rail being parallel and arranged one above the other, each rail extending from a same side wall of the support of the headrest substantially towards a front of the headrest, each guide rail having a proximal end located at the support of the headrest and a distal end positioned at a distance from the support of the headrest, and a guide pin constituting the cam, at the distal end of each of the guide rails, protruding in a substantially vertical direction, the pins of each of the guide rails pointing towards one another and oriented along a same axis, and wherein the airtight housing receiving the loudspeaker has an upper wall and a lower wall parallel to each other, a curved groove constituting the cam race being formed in the upper wall and in the lower wall, the groove of the upper wall being identical and parallel to the groove of the lower wall, the guide pin of the upper rail being received in the groove of the upper wall of the airtight housing, and the guide pin of the lower rail being received in the groove of the lower wall of the airtight housing, so as to guide the airtight housing relative to the guide system, simultaneously in translation and in rotation, from the first usage position to the second usage position.

3. The headrest of claim 2, wherein at least one end of the cam race has a reduction in cross-section, so as to form a pressure point when the cam reaches the at least one end.

4. The headrest of claim 3, wherein the speaker unit support comprises a casing receiving the speaker unit, the casing being provided with orifices allowing output of sound emitted by the loudspeaker.

5. The headrest of claim 4, wherein the pivoting connection between the speaker unit and the speaker unit support comprises a torque-management hinge between the airtight housing of the speaker unit and the casing.

6. The headrest of claim 5, wherein the speaker unit support is slidably guided relative to the guide system by a sliding shoe slidably mounted on at least one guide rail of the guide system and fixed to the speaker unit support.

7. The headrest of claim 2, wherein the guide system also comprises a stiffening bridge connecting distal ends of the upper rail and the lower rail.

8. The headrest of claim 7, wherein the speaker system comprises a drive system configured to drive the movement of the speaker unit between the first usage position and the second usage position, and vice versa, said drive system being controlled via a control system so as to control the movement of the speaker unit between the first usage position and the second usage position.

9. The headrest of claim 8, wherein the drive system comprises an electric motor and a cable comprising a first end and a second end, the first end being connected to the electric motor and the second end to the speaker unit support.

10. The headrest of claim 9, wherein the support of the headrest has a substantially vertical plane of symmetry, two speaker systems being symmetrically arranged, one on each side of the support of the headrest, with respect to the plane of symmetry of the support of the headrest.

11. The headrest of claim 10, comprising coordination means configured so that the movement of each of the enclosures of each of the speaker systems, one on each side of the support of the headrest, is carried out in a coordinated manner.

12. A method for adjusting the position of the speaker unit of a headrest according to claim 1, wherein: the speaker unit support is moved in translation along said at least one guide rail between the position close to the support of the headrest and the position away from the support of the headrest, such that the speaker unit moves from the first usage position to the second usage position, or the speaker unit support is moved in translation along said at least one guide rail between said position away from the support of the headrest and said position close to the support of the headrest, such that the speaker unit moves from the second usage position to the first usage position.

13. A vehicle seat comprising the headrest of claim 1.

14. An audio system for a vehicle, comprising the headrest according to claim 1, further comprising an audio signal generator connected to each of the at least one speaker system of the headrest so as to distribute sound via the speaker unit of the at least one speaker system, in the first usage position and in the second usage position.

* * * * *